Patented Aug. 10, 1954

2,686,108

UNITED STATES PATENT OFFICE 2,686,108

MICROFOSSIL PROSPECTING FOR PETROLEUM

William S. Hoffmeister, Tulsa, Okla., assignor to Standard Oil Development Company, a corporation of Delaware No Drawing. Application August 10, 1951, Serial No. 241,387

7 Claims. (Cl. 23—230)

This invention concerns a novel procedure or method employed in prospecting for petroleum deposits. The method of this invention is of particular application in the determination of ancient shore lines, now buried in the earth, permitting identification of prospective areas for the drilling of exploratory oil wells. In accordance with this invention, microfossils recovered from samples removed from wells spaced over an area under investigation are examined and counted. In particular, the nature and number of microfossils in a particular "sedimentation-time unit" of each well are determined. "Isobotanical lines" may then be drawn through points having the same microfossil population or having the same nature of microfossils. As will be developed, these isobotanical lines parallel the ancient shore line in the particular formation studied and indicate with reasonable accuracy the actual position of the shore line. It is then possible to identify areas which were one time reef areas and areas which were located adjacent the shore line so as to be favorable for the occurrence of petroleum.

While a great many methods are now known which may be employed in attempting to locate oil deposits in the earth, as yet no method has been found to positively identify the source of oil reservoirs. Thus, while geophysical prospecting methods, geochemical prospecting methods and others may be employed to provide indications of potential oil reservoirs, none of these methods is of a nature to infallibly indicate the presence of oil. Thus, for example, it is now known that structural or stratigraphic traps in the earth are required to provide a suitable environment for the occurrence of oil. Methods are known for locating such traps. However, it frequently occurs that when a borehole has been drilled into a trap, in fact no oil is present. The prospecting method of this invention is therefore intended to supplement conventional exploration methods by indicating areas in which traps will be most likely to contain oil deposits. By this means the area which must be considered in the search for oil may be substantially narrowed, with the result that a greater percentage of producing wells can be drilled, reducing the unit cost of exploration and drilling per producing well.

The process of this invention is based in part on the fundamental principle that most oil deposits originated in shallow or brackish water adjacent to ancient seas. In the case of shore lines which followed a history of retrogression and transgression, the oil-forming organic material may be deposited on or adjacent the shore line. Again a frequent source of oil is the organic matter preferentially accumulating on reefs just off shore. Consequently, the definition of prospective areas for oil recovery may be made with some precision by determining the location of ancient shore lines. Particularly in the case in which producing wells have already been located, by knowing their distance from the ancient shore line and the location of the shore line, it is then practical to predict the precise location of other producing wells which generally will parallel the shore line.

Expressed in the simplest terms therefore, the process of this invention is adapted to locate and define ancient shore lines. This is practical according to the process of this invention by means of a quantitative study of the microfossils deposited in the geological time period during which the ancient sea existed. As employed herein, the term "microfossils" is used as a generic term to identify fossil spores, eggs, cysts, pollen, and the fossils of minute animals. Numerically the fossil pollen far outnumber the other types of fossils identified and are particularly to be considered. In the case of plant spores and pollen, the concentration of these substances in the sediment of an ancient sea varies in proportion to the amount of vegetation on the coast, the prevailing wind, the location of reefs and oceanic currents. In any case however, the abundance of spores and pollen in the sediment consistently decreases seaward away from the shore. Again, only the smallest forms of pollen and spores can be carried any distance from the shore line into the sea. As a result, by a quantitative determination of the total number or the number of a particular size of fossil spores and fossil pollen it is possible to determine the approximate location of a shore line. In the case of minute animals, certain of these may be detected in fossil form which increase in number as the distance from the shore line seaward is increased. Thus, as will be disclosed, certain minute animals are most numerous in a marine environment and decrease in number in brackish or shallow water near the shore, and are substantially non-existent on the shore. Again therefore, examination of microfossils to detect fossils of these minute animals serves to establish the location of the ancient shore line. In all cases, as used herein, the term "microfossil" is applied to fossils having a diameter not more than about 200 microns.

In determining the position of ancient shore lines by a quantitative investigation of the microfossils to be found in the earth, it is necessary to base the quantitative study on a particular sedimentation-time unit. Thus the desired results cannot be obtained by a quantitative determination of all microfossils encountered throughout the length of a well bore, but rather, it is necessary to consider the nature and number of microfossils in a particular portion of the well bore corresponding to a particular unit of geologic time. This is necessary since in a given well bore microfossils may be found at different levels in the well corresponding to the deposition of sediments at different periods of geologic time. Due to tectonic effects or for other reasons, the same number of sedimentary beds may not be present in other wells drilled in the general vicinity. As a result, any attempt to determine location of ancient shore lines must be restricted to the examination of the portion of different well bores corresponding to one and the same unit of geologic time.

For the purposes of this invention, a sedimentation-time unit is identified as a particular geologic formation or a smaller unit within a formation. The term "formation" is well known to the geologist and signifies a sedimentary stratum or contiguous series of strata that is sufficiently distinctive to be recognized as the same stratum or series of strata when encountered at separate locations, as for example the Chattanooga shale.

The determination of a particular sedimentation unit having the same geologic time in a group of wells may be made in a number of ways. For example, it is possible to determine the lithological characteristics of the different well bores so as to accurately determine the portion of each well bore which corresponds to the same unit of geologic time. Again, a consideration of microfossils themselves may be employed to identify the same formation or formation unit in the different well bores. As the techniques for determining time horizons for identification of the sedimentation-time unit, i. e. of the particular geologic formation or unit within a formation, are known, no further description of this step of the process is required.

With this background it is now possible to appreciate the procedure to be followed in practicing this invention. In locating an ancient shore line in a particular area to be explored, the first step in the procedure entails the recovery of samples from boreholes spaced throughout the area. It is desirable that the boreholes should be spaced as widely and numerously throughout the area under investigation as practical, since the precision with which the shore line can be determined will be proportional to the number and spacing of boreholes in the area. However, effective determinations of the position of the ancient shore line may be made employing a relatively small number of boreholes. Examination of the samples of all of the boreholes is then to be made to identify the particular portion of each well corresponding to one and the same unit of geologic time. This may be conducted as indicated by an examination of the nature of microfossils present, for example. Thus it is generally found that certain microfossils will be found in one and only one formation, even though other microfossils may be present in more than one formation in the different boreholes. Again a determination of the principal rock types or even trace rock types in the different boreholes will serve to locate time horizons to permit identification of a given time unit in each of the wells considered. As an example of this technique, the occurrence of bentonite in thin layers may serve to indicate the location of a particular geologic time period in the different wells involved. Consequently, by one of these techniques, or by other suitable techniques, a given formation in each of the wells is located.

The samples obtained from that portion of each of the boreholes corresponding to the selected time unit are then to be examined. A suitable technique requires the examination of samples of the same size from every 10 or 20 feet, or even every 100 feet, of the borehole throughout the time unit to be considered. To permit identification of the nature and number of microfossils, aliquot portions of each of the samples are first digested with hydrofluoric acid to dissolve the rock minerals present in the sample. For this purpose it is suitable to employ hydrofluoric acid having a concentration of about 50% employed in sufficient quantities to cover the sample to be digested. Digestion for a period of about 16 hours at room temperature has been found satisfactory. The residue of this hydrofluoric acid digestion process may then be separated from the acid by dilution with distilled water, settling and decantation or, preferably, centrifuging. The residue is then washed again with distilled water and is then preferably centrifuged again to concentrate the material. The microfossils are then mounted in glycerine jelly on microscope slides employing substantially the same distribution of sample particles on each slide. It is preferable to dilute the entire residue from a given sample with a particular amount of glycerine jelly and to then make up about 5 to 10 microscope slides from the total sample contained in glycerine jelly. Subsequently it is possible to compute the spore and pollen population per gram of original sample knowing the portion of sample treated and the quantity of glycerine jelly employed in making up the slides for examination. The glycerine slides containing the microfossils are then subjected to systematic microscopic examination. The total area of each slide is scanned with a microscope to permit a tabulation of the nature and number of each of the different microfossils present. Information of this character, developed from each of the samples spread throughout the selected sedimentation-time unit, is then tabulated and totaled to provide a count of the microfossils present in this portion of each borehole. This information in a number of different forms, as will be brought out, is then plotted on a map of the area under investigation. Thereafter isobotanical lines may be drawn through points on the map having the same nature of microfossils and/or having the same total number of microfossils. These isobotanical lines on inspection will designate the position of the ancient shore line.

The isobotanical lines prepared as generally described, may be employed to identify the ancient shore line by a number of criteria. As formerly stated, the distance to which spores and pollen can be carried seaward is dependent upon the size of these spores or pollen. Larger spores or pollen will be concentrated in-shore, while only the smaller spores and pollen will be carried any substantial distance off-shore. Consequently, identification of the ancient shore line may be made by determination of the isobotanical lines corresponding to particular ratios of large to small microfossils. A suitable ratio may be formed by establishing the proportion between microfossils from about 70 to about 120 microns and those about 20 to 50 microns in size. Proximity to an ancient shore line is generally indicated when this ratio is about 1:4.

Again, the total number of microfossils may be employed to determine the position of the shore line. It has been found that the total number of spores and pollen in a given time unit drops sharply as the distance seaward from the shore line is increased. As a result from a consideration of the isobotanical lines showing the total number of microfossils, the position of the shore line will generally be indicated between isobotanical lines showing a substantial drop in the total number of microfossils. More specifically it has been found that when about 7500 spores and pollen per gram of sediment occur, proximity to an ancient shore line is indicated.

Finally, "isozoological" lines drawn through the microfossil count of minute animals occurring in the marine environments may be employed to identify the shore line. As an example of this, it has been found that Hystrichospherids and micro-foraminifera occur with the fossils of spores and pollen, but are inversely proportioned to fossil spores and pollen. Thus, contra to the occurrence of fossil spores and pollen, the fossils of these specific minute animals become more abundant as the distance from the shore line increases.

As described therefore, a consideration of the isobotanical lines from any one or a combination of these quantitative microfossil tabulations may be made.

To more clearly demonstrate the application and nature of this invention, reference may be made to prospecting results carried out in accordance with the invention.

One study which was conducted in the United States was carried out in a lower Pennsylvanian formation for a sedimentation-time unit about 1500 feet thick in the locality studied. In one particular application of the invention nineteen wells were drilled. Composite samples were prepared from each well based on samples obtained from every 10 feet interval of the identified sedimentation-time unit of each borehole. The samples were digested and mounted on microscope slides as formerly described. It was found that the spore population varied among the different wells from a minimum of 600 counts to about 20,000 counts per gram of sediment. On plotting the total microfossil counts obtained at each well in the indicated time unit and by drawing isobotanical lines through points having the same spore count, it was found that the isobotanical lines were parallel to known oil wells in the area and were parallel to the ancient shore line there present. The location of the ancient shore line was checked by lithologic evidence.

Similar studies were made in connection with other formations in other localities. In each case by employing the technique of this invention as described herein, it was found that the isobotanical lines accurately indicated the presence of an ancient shore line and paralleled oil trends in the locality studied.

The basic principles on which this invention is based were also tested by a determination of the microfossil population of recent Gulf of Mexico and of recent Atlantic Ocean bottom samples. It was found that the spore and pollen population decreased in each case in a substantially logarithmic fashion as the distance seaward increased. Again it was verified that the occurrence of Hystrichospherids and micro-foraminifera increased in number as the distance from the shore increased.

As described therefore, the process of this invention concerns a method for prospecting for oil in which samples from wells are examined for microfossil population. Boreholes are drilled throughout the locality to be studied and a particular sedimentation-time unit is identified in each of the boreholes. Samples are then obtained from each of the wells extending through the sedimentation-time unit selected. Microfossils present in these samples are then obtained for examination by digestion in hydrofluoric acid, washing, and mounting in glycerine jelly. The microfossils are tabulated and are characterized. Thereafter the microfossil determinations are plotted on a map and isobotanical lines are drawn through the points having the same microfossil population, having the same ratio of large to small microfossils or other correlative factors. Based on this information, it is possible to identify the location of an ancient shore line to prescribe prospective areas for oil exploration. Particularly in the case in which oil has been encountered in the area, it is practical to identify other prospective areas by selection at the same distance from the indicated ancient shore line.

What is claimed is:

1. The process of exploring for oil, gas, and similar deposits including the steps of: drilling a plurality of boreholes spaced over a given area, identifying a particular sedimentation-unit of the same geologic time in each of said boreholes, recovering samples from each of said boreholes representative of the sediments extending through the said sedimentation-time unit, digesting an aliquot portion of each of said samples in a solution of hydrofluoric acid to dissolve mineral matter and to leave an undissolved residue consisting principally of microfossils, washing said residue and mounting the residue on microscope slides, whereby the microfossil population of each of said boreholes may be determined indicating proximity to ancient shore lines.

2. The process of exploring for oil, gas, and similar deposits including the steps of: drilling a plurality of boreholes spaced over a given area, identifying a particular sedimentation-time unit of the same geologic time in each of said boreholes, recovering samples from each of said boreholes representative of the sediments extending through the said sedimentation-time unit, digesting an aliquot portion of each of said samples in a solution of hydrofluoric acid to dissolve mineral matter and to leave an undissolved residue consisting principally of microfossils, washing said residue and mounting the residue on microscope slides, determining the microfossil population on each slide whereby the population in each of the boreholes may be found, and plotting said microfossil populations on an index map of the said area, whereby isobotanical lines through points having the same population may be drawn paralleling ancient shore lines and oil deposits.

3. The process defined by claim 1 in which the said microfossils comprise fossils of spores, pollen, eggs, cysts, and minute animals having a diameter less than about 200 microns.

4. The process defined by claim 1 in which the said hydrofluoric acid solution has a strength of about 50%.

5. The process of exploring for oil, gas, and similar deposits including the steps of: drilling a plurality of boreholes spaced over a given area, identifying a particular sedimentation-time unit of the same geologic time in each of said boreholes, recovering samples from each of said boreholes representative of the sediments extending through the said sedimentation-time unit, digesting an aliquot portion of each of said samples in a solution of hydrofluoric acid to dissolve mineral matter and to leave an undissolved residue consisting principally of microfossils, washing said residue and mounting the residue on microscope slides, whereby the microfossil population of each of said boreholes may be determined indicating proximity to ancient shore lines, and thereafter drilling wells in the portion of the said given area wherein said population is about 7500 per gram of sediment.

6. The process of exploring for oil, gas, and similar deposits including the steps of: Drilling a plurality of boreholes spaced over a given area, identifying a particular sedimentation-time unit of the same geologic time in each of said boreholes, recovering samples from each of said boreholes representative of the sediments extending through the said sedimentation-time unit, digesting an aliquot portion of each of said samples in a solution of hydrofluoric acid to dissolve mineral matter and to leave an undissolved residue consisting principally of microfossils, washing said residue and mounting the residue on microscope slides, whereby the microfossil population of each of said boreholes may be determined indicating proximity to ancient shore lines, and thereafter drilling wells in the portion of the said given area wherein the ratio of large microfossils to small microfossils is about 1:4.

7. The process of exploring for oil, gas, and similar deposits including the steps of: drilling a plurality of boreholes spaced over a given area, identifying a particular sedimentation-time unit of the same geologic time in each of said boreholes, recovering samples from each of said boreholes representative of the sediments extending through the said sedimentation-time unit, digesting an aliquot portion of each of said samples in a solution of hydrofluoric acid to dissolve mineral matter and to leave an undissolved residue consisting principally of microfossils, washing said residue and mounting the residue on microscope slides, determining the microfossil population on each slide whereby the population in each of the boreholes may be found, and plotting said microfossil populations on an index map of the said area, whereby isobotanical lines through points having the same population may be drawn paralleling ancient shore lines and oil deposits, and thereafter drilling wells in the portion of the said given area between isobotanical lines indicating a sharp decrease in population of spores and pollen.

References Cited in the file of this patent

UNITED STATES PATENTS

| Number | Name | Date |
|---|---|---|
| 2,038,720 | De Groote | Apr. 28, 1936 |
| 2,269,889 | Blau | Jan. 13, 1942 |
| 2,294,425 | Sanderson | Sept. 1, 1942 |

OTHER REFERENCES

"Finding and Producing Oil," prepared and published by American Petroleum Institute, 1939, First edition, pages 34–38.